Nov. 29, 1927.
H. C. ANDERSON
1,650,885
RESILIENT WHEEL
Filed Dec. 3, 1924
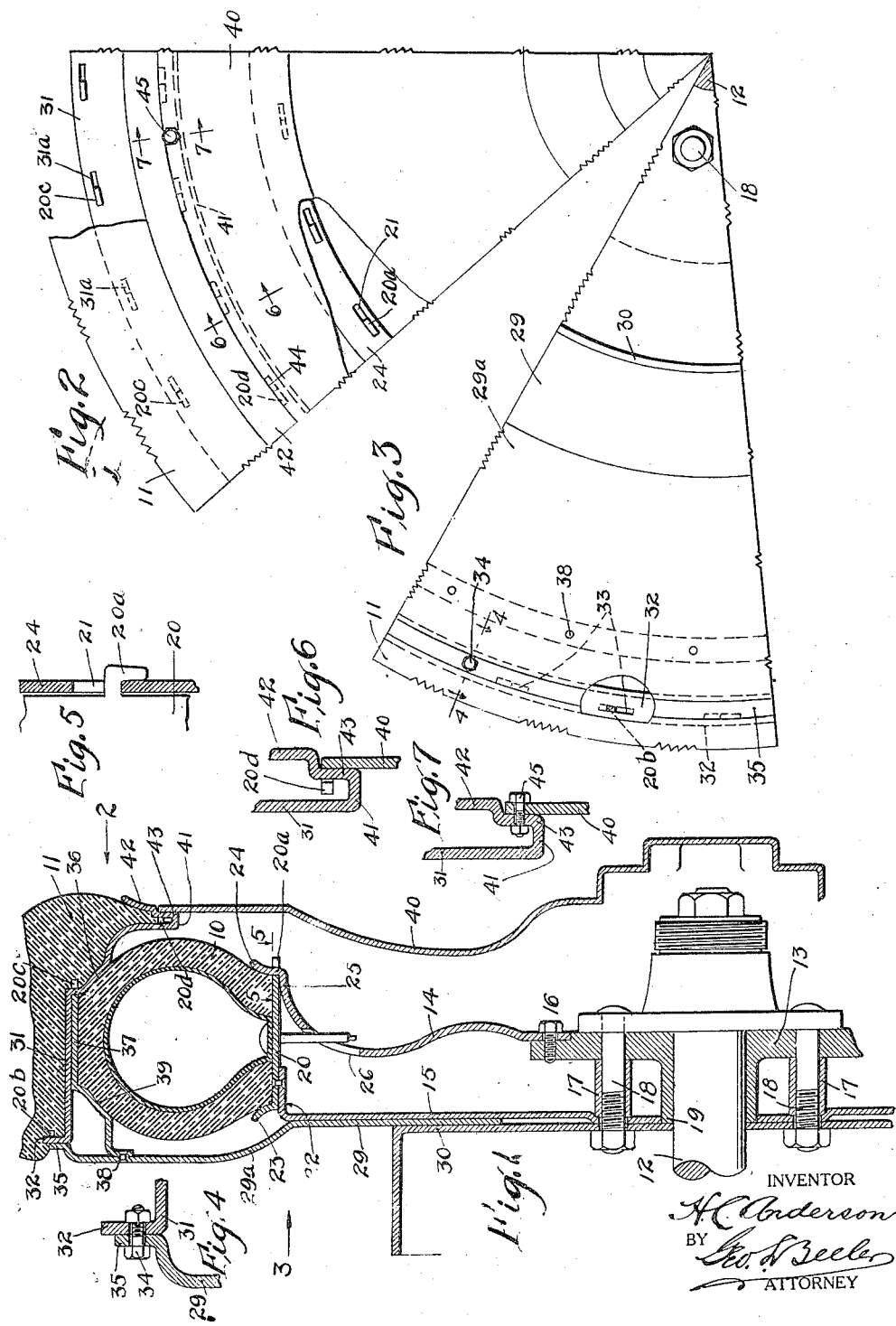

Patented Nov. 29, 1927.

1,650,885

UNITED STATES PATENT OFFICE.

HIRAM C. ANDERSON, OF NEW YORK, N. Y.

RESILIENT WHEEL.

Application filed December 3, 1924. Serial No. 753,645.

This invention relates to resilient disk wheels and more particularly to wheels of that general type which are readily assembled or disassembled.

Among the objects of this invention is to provide a resilient disk wheel the parts of which can be locked together with rapidity and with a minimum amount of labor, said wheel comprising for this purpose a novel locking means.

Another object of this invention is to provide a resilient disk wheel comprising a plurality of parts, and locking means for securing said parts together positioned along said wheel and acting simultaneously at different parts of the wheel while said parts are being engaged to lock the same together.

Still another object of this invention is to provide a resilient disk wheel the members of which co-operate in a unique manner in conjunction with a novel fastening means to provide a simple and efficient construction.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a fragmentary cross-sectional view of the wheel assembled in place.

Fig. 2 is a side view of a portion of the wheel looking in the direction of arrow 2 on Fig. 1, and with parts broken away.

Fig. 3 is a side view of a portion of the wheel looking in the direction of arrow 3 of Fig. 1, and with parts broken away.

Fig. 4 is an enlarged sectional view on the line 4—4 of Fig. 3.

Fig. 5 is an enlarged sectional view on the line 5—5 of Fig. 1.

Fig. 6 is an enlarged sectional view taken on the line 6—6 of Fig. 2.

Fig. 7 is an enlarged sectional view taken on the line 7—7 of Fig. 2.

Referring now more particularly to the drawings, the disk wheel is shown in connection with the usual pneumatic tire 10 and the solid tire 11, the former of which is positioned within the resilient wheel so as to support certain parts thereof, while the latter is in turn mounted upon an outer circumferential portion of said wheel so as to be resiliently supported thereon. Said resilient wheel thus comprises two main sections acting individually with said tires, the one acting with the pneumatic tire being described hereinafter as the inner section, while the one acting with the outer tire will be designated as the outer section of the disk wheel.

The inner section of the resilient disk wheel will thus be seen as comprising supporting means such as a plurality of supporting disks or plates having suitable co-operation with the axle 12, as by means of an adapter 13. More specifically, said supporting means comprise plates 14 and 15 spaced from each other as by means of the adapter which has connection with the plate 14 by means of a shoulder and screw arrangement at 16, while the plate 15 is secured thereto by means such as thimbles 17 and bolts 18 passing therethrough, said plate abutting against a flange of the adapter at 19. The plate 14 is disposed preferably adjacent to a plane perpendicular to the axis of the wheel and passing through the center of the pneumatic tire, while the plate or disk 15 is preferably at that side of the wheel remote from the end of the axle. The plates 14 and 15 co-operate with means for supporting the pneumatic tire through a device comprising a novel locking means. More specifically, said plates support a cylindrical portion or member 20, said member having fixed engagement preferably with the plate 15 and detachable locking engagement with the other plate. The locking device aforesaid is made effective by a rotary movement or the like of the plates relatively to each other, the result of which is to wholly effect a strong engagement of said parts through as large a space or angle as may be desired by a single movement. Thus said member has locking tongues or headed means such as hooks 20$^a$ while the plate 14 is provided with openings or slots 21 to receive said hooks to permit of a rotational engagement thereof with the plate as shown in Fig. 5. After the disk 15 is fastened to the adapter, and the plate 14 engaged with the member 20 as stated, said plate is secured to the adapter at 16, which then prevents relative rotation of the parts of the inner section, thus insuring a sure and continuous interlock of said parts. The cylindrical member 20 which is attached to a flange 22 of the disk 15 by suitable fasteners such as rivets has a flange 23 for affording lateral support to the pneumatic tire formed along an edge thereof remote from the fastening device, while plate 14 is provided with means located in opposite relation to the flange 23 such as a flange 24 for affording lateral support to said tire upon the other side thereof. The plate 14 is provided with means for carrying the member 20, such as a cylindrical portion 25, which is made preferably by forming the plate with an annular convexity as shown at 26. The cylindrical portion 25 is secured against movement lateral to the member 20 by means of said locking hooks. As thus constructed the inner section of the resilient wheel affords a strong and sure support for the pneumatic tire, and one which will withstand reliably all the rough usage to which it may be subjected.

The outer section of the resilient disk wheel embodies the novel fastening device, whereby it is readily demounted as for purposes of repair and inspection, and also rapidly assembled in place at a minimum expense of time and labor. It has been so arranged and constructed as not only to perform with the maximum efficiency the usual functions of a resilient disk wheel, but also to utilize to the best advantage the novel locking means herein described. The specific arrangement of the wheel construction is an object which is rather subsidiary to the locking means disclosed, and is intended to be mainly representative of the utility and advantage which said locking means possesses.

Said outer section of the resilient disk wheel comprises a floating member or disk 29, which moves between suitable guide means such as the disk 15 and the brake drum 30. Said disk is offset adjacent to the pneumatic tire as at 29ª, and then extends into locking engagement with a structure which is secured to the outer tire 11. Said structure comprehends a member 31 having means for affording lateral support to said outer tire, and having engagement with the disk 29 by means of the novel locking device. Thus said member has a circular flange 32 extending along an edge thereof, said flange being slotted as shown at 33, while the disk 29 is provided with hooks 20ᵇ to enter said slots and engage said member when the same is moved relatively to the other in predetermined manner as by rotation. Said locking device comprehends an arrangement to prevent the unlocking thereof, except at the will of the operator. More specifically, it is desirable for this purpose to retain said members against movement and this result is accomplished preferably by using stop means such as a bolt 34 engaging the flange 32 with a flange 35 formed at the edge of said disk, said bolt being spaced preferably between two adjacent hooks. The flange 35 also serves to cover the slots in the member 31. The nuts for the bolts 34 have preferably rigid engagement with the outer rim member as by being welded to the flange 32.

Said outer section of the resilient disk wheel is provided with suitable means bearing laterally upon the pneumatic tire, for the purpose of securing a relatively rigid wheel structure. Thus the member 31 is provided with an annular inclined flange 36 upon the side of the tire adjacent to the end of the axle, lateral bearing means being provided likewise at the other side of said tire. The latter mentioned means takes preferably the form of an annular member 37 which is secured fixedly to the disk 29 as at 38, said member having an annular inclined flange at 39 to receive said pneumatic tire. The main cylindrical portion of the member 37 lies at the tread of said tire and in direct bearing relation to the member 31. For the purpose of providing lateral stiffness of the rim portion of said outer section, the two members aforesaid are interlocked, as by means of my novel locking device, at an edge remote from the disk 29. Thus the member 37 is provided with hooks 20ᶜ to engage the member 31 at the slots 31ᵃ thereof. In assembling the outer section as thus far described, said members are interlocked by a rotational movement before the final interlock between the disk 29 and the member 31 by means of bolts 34 is effected.

A cover 40 is provided for the outer section of the resilient disk wheel, which has engagement with an axially directed annular wall 41 of the member 31 by means of my improved locking device. To provide lateral support for the outer tire a flange 42 is provided adjacent to said locking device, and preferably as an extension of the rim 41. Said annular wall thus comprises a U-shaped portion 43 which is slotted as at 44 to receive the hooks 20ᵈ for engagement of the cover with the member 31 as by a rotational movement or the like. Said locking means comprehends stop means for preventing undesired movement of said cover, such as a bolt 45, thereby controlling the setting of said locking device. The nut for said bolt is preferably rigidly secured or welded in place. The edge portion of said cover at the hooks is arranged to cover said slots. The outer arm 42 of the U-shaped portion is offset as shown to receive the edge portion of the cover plate 40, thus providing for a neat appearance at this joint.

In the preferred embodiment of my invention disclosed herein, it will be observed that the wheel is assembled by moving the parts thereof into place in a direction parallel to the axis of the wheel. This insures an easy manipulation of the wheel structure. As the most desirable way of accomplishing this end, the hooks have been constructed so that their shanks lie substantially parallel to the axis of the wheel, the slots lying substantially at right angles thereto. While my improved construction has to do primarily with protecting and safety means for the pneumatic tire housed within the protector, it will be noted that the appearance of the complete finished structure is substantially similar to the now largely used disk wheel construction.

I claim:

1. In a resilient wheel, the combination with an inner wheel, of an outer wheel structure supported thereby comprising outer cushioning means, rim means for supporting said cushioning means, said rim means having an annular U-shaped portion at a side of the wheel and arranged to receive a portion of said cushioning means between the arms thereof and to act as a lateral support therefor, and an outer cover plate having detachable engagement with said U-shaped portion, the outer arm of said U being offset, and said cover plate being arranged to lie in said offset at the edge of the cover plate.

2. In a resilient wheel, the combination with an inner wheel structure having a pneumatic tire, of an outer wheel comprising an outer rim member having a plurality of annular flanges one of which lies at a side of said tire while the other lies along the outer periphery thereof, and an auxiliary rim member comprising a plate having sliding engagement with said inner wheel and disposed upon the opposite side of said tire, said plate extending into supporting engagement with said outer rim member at the side of the tire, and an annular flange secured to said plate and having engagement with said outer rim member adjacent to the central plane of the wheel perpendicular to the axis thereof, hooks being provided whereby said rim members engage simultaneously adjacent to the side of the wheel and adjacent to said central plane as aforesaid.

In testimony whereof I affix my signature.

HIRAM C. ANDERSON.